United States Patent
Sun et al.

(10) Patent No.: US 10,309,691 B1
(45) Date of Patent: Jun. 4, 2019

(54) HELIOSTAT CORRECTION SYSTEM BASED ON CELESTIAL BODY IMAGES AND ITS METHOD

(71) Applicant: SHANGHAI PARASOL RENEWABLE ENERGY CO., LTD, Shanghai (CN)

(72) Inventors: Nan Sun, Shanghai (CN); Ping Shen, Shanghai (CN); Siliang You, Shanghai (CN); Yuda Chen, Shanghai (CN)

(73) Assignee: SHANGHAI PARASOL RENEWABLE ENERGY CO., LTD, Shanghai (CN)

( * ) Notice: Subject to any disclaimer, the term of this patent is extended or adjusted under 35 U.S.C. 154(b) by 0 days.

(21) Appl. No.: 16/194,294

(22) Filed: Nov. 17, 2018

Related U.S. Application Data

(63) Continuation-in-part of application No. PCT/CN2018/081854, filed on Apr. 4, 2018.

(51) Int. Cl.
| | |
|---|---|
| *F24S 50/20* | (2018.01) |
| *F24S 20/20* | (2018.01) |
| *G06K 9/20* | (2006.01) |
| *G05D 3/12* | (2006.01) |
| *G05B 23/02* | (2006.01) |

(52) U.S. Cl.
CPC ............. *F24S 50/20* (2018.05); *F24S 20/20* (2018.05); *G05B 23/02* (2013.01); *G05D 3/12* (2013.01); *G06K 9/209* (2013.01)

(58) Field of Classification Search
CPC ........... F24S 20/20; G05B 23/02; G05D 3/12; G06K 9/209
See application file for complete search history.

(56) References Cited

U.S. PATENT DOCUMENTS

| | | | | |
|---|---|---|---|---|
| 2013/0284162 A1* | 10/2013 | Burton | ................. | G01S 3/7861 126/601 |
| 2014/0320990 A1* | 10/2014 | Gilbert | ................. | G02B 7/183 359/853 |

FOREIGN PATENT DOCUMENTS

| | | |
|---|---|---|
| CN | 101776919 A | 7/2010 |
| CN | 103728983 A | 4/2014 |
| CN | 102937814 B | 1/2015 |
| CN | 103345261 B | 10/2015 |
| CN | 106249764 A | 12/2016 |

* cited by examiner

*Primary Examiner* — Edward Park

(57) ABSTRACT

A heliostat correction system includes an image acquisition module for acquiring the image of a celestial body in a field of view and sending the image to a data analysis module which analyzes the deviation value between the celestial body image and the image center in an image coordinate system and transmits the deviation value to a correction calculation module which decomposes the deviation to a corresponding rotation axis according to the rotation mode of a heliostat to obtain the deviation angle of each rotation axis; a data storage module is used to store the correction result of the heliostat and the single correction period control command list of the heliostat; a communication module reads the single correction period control command list from the data storage module, sends the list to the heliostat, and simultaneously controls the image acquisition module to shoot according to the rotation period of the heliostat.

8 Claims, 4 Drawing Sheets

HELIOSTAT CORRECTION SYSTEM BASED ON CELESTIAL BODY IMAGES AND ITS METHOD

CROSS REFERENCE TO RELATED APPLICATIONS

The present application is a Continuation-In-Part Application of PCT Application No. PCT/CN2018/081854 filed on Apr. 4, 2018, which claims the benefit of Chinese Patent Application No. 201711209150.3 filed on Nov. 27, 2017. All the above are hereby incorporated by reference.

FIELD OF THE INVENTION

The present invention relates to a heliostat correction system based on celestial body images and its method, and belongs to the technical field of heliostat correction.

BACKGROUND OF THE INVENTION

In a solar thermal power station, a certain number of heliostats are used to reflect the sunlight in an area into a heat absorber area, and the energy required for power generation is obtained by concentrating the sunlight. However, the position of the sun changes continuously with time, so the heliostats need to move continuously to correct the exit direction of the reflected light, so that the light spot can accurately fall in the area of the heat absorber, thus improving the working efficiency of the whole solar thermal power station.

The positions of celestial bodies (such as the sun, the moon, first-class stars, etc.) that move regularly and have a certain brightness can be accurately calculated by the corresponding astronomical formulas, that is, the incident vector at any given moment is known. The space positions of the heat absorber area and the heliostat are relatively fixed, i.e. the reflection vector at any moment is known. Therefore, in theory, for the heliostat with a fixed installation position, its mirror surface normal vector at any given moment can be accurately calculated, which is then decomposed into the rotation angle of the corresponding rotation axis according to the rotation mode of the heliostat, so as to realize the accurate mechanical motion of the heliostat.

Although sufficient mechanical motion accuracy of the heliostat has been ensured in design, various new errors will be introduced in the process of processing, manufacturing, transportation and installation as well as daily operation, such as tilt of the rotation axis of the heliostat, foundation deformation, installation attitude deviation, deformation of the supporting structure, etc., making the newly installed heliostat unable to meet the design requirements and its reflected spot position will shift, thus directly affecting the power generation efficiency. Therefore, after installation, the heliostat needs to be corrected to ensure the accuracy of its mechanical motion before it can meet the requirements of normal operation, which is also a routine workflow of the solar thermal power station.

At present, the heliostat correction technology mainly involves identification and processing of the reflected light spot. Chinese Patent (CN102937814B) first irradiates the light spot on a carrier, then calculates the precision of the heliostat by means of image acquisition and processing, and finally corrects the heliostat according to the result. Chinese Patent (CN103345261B) sets up a photosensitive array directly under the heat collector in the same direction, calculates the deviation of the light spot center according to the intensity of the output signal, and finally corrects the rotation corner of the heliostat. Chinese Patent (CN103728983A) installs an image acquisition device on the top of the tower to photograph a specific heliostat, and calculates the deviation between the actual rotation angle and the theoretical rotation angle from the light spot position obtained by acquisition. Although the above three methods are all traditional methods of heliostat correction, the number of heliostats that can be corrected at the same time is limited because the light spot carriers (white boards, photosensitive arrays, image acquisition devices, etc.) they use are installed on the tower.

In modern solar thermal power stations, there are usually thousands of heliostats, and the data points for heliostat correction need to cover the range of mechanical motion as much as possible in order to obtain the best correction effect. Obviously, the traditional correction methods with low efficiency usually take a long time to make the heliostats in the whole solar thermal power station reach the optimal working state, which can no longer meet the operational requirements of modern solar thermal power stations. Therefore, there is a need for a high-efficiency, high-precision and convenient method to correct heliostats, which can accurately correct any number of heliostats at the same time.

SUMMARY OF THE INVENTION

The purpose of the present invention is to provide a heliostat correction system based on celestial body images and its method, in view of the fact that the current technology cannot meet the existing needs, which takes celestial bodies (such as the sun, the moon, first-class stars, etc.) that move regularly and have a certain brightness as markers, and can carry out correction during the day and at night, thus reducing the influence on the power generation efficiency and improving the correction efficiency.

The technical proposal of the present invention is as follows: a heliostat correction system based on celestial body images, comprising a heliostat fixed on a rotation axis; the reflecting surface of the heliostat is provided with a heliostat correction system; the heliostat correction system comprises an image acquisition module, a data analysis module, a correction calculation module, a data storage module and a communication module; the image acquisition module is in the same direction as the reflecting surface of the heliostat, i.e. both facing celestial bodies or other markers; the deviation angle between the optical axis vector of the image acquisition module and the normal vector of the heliostat is known; the image acquisition module is used for acquiring images of celestial bodies moving regularly in the field of view and having a certain brightness, and then sending them to the data analysis module, which analyzes the deviation value between the celestial body image and the image center in the image coordinate system and transmits the deviation value to the correction calculation module, which decomposes the deviation value to the corresponding rotation axis according to the rotation mode of the heliostat to obtain the deviation angle of each rotation axis; the data storage module is used for storing the correction result of a single heliostat and the single correction period control command list of the heliostat; the communication module reads the single correction period control command list from the data storage module and then sends the list to the heliostat while controlling the image acquisition module to shoot according to the rotation period of the heliostat.

In the present invention: the image acquisition module comprises a light intensity adjusting device, an imaging light path and a digital image sensor, wherein the light intensity adjusting device is a neutral attenuation sheet or other device capable of adjusting the incident light intensity of a celestial body, and the imaging light path is a lens or a pinhole.

In the present invention: the correction calculation module adopts two correction methods according to all deviation angle data of a single correction period:

Method 1: The error correction model based on various error parameters is derived from the theoretical mathematical model of the heliostat, and the error angle data corresponding to a time sequence is substituted into the error correction model to obtain better error parameter values;

Method 2: The exact position of a celestial body is determined according to the image acquisition time; the ideal rotation angle sequence of each axis based on time in a single correction period is obtained, and then a connection is established between the ideal rotation angle and the error angle sequence through the acquired time sequence to generate an error angle compensation table for each rotation axis.

A heliostat correction system based on celestial body images, comprising the following steps:

(1) Installing the heliostat correction system on the heliostat to ensure that the image acquisition module in the heliostat correction system is in the same direction as the reflecting surface of the heliostat; the deviation angle between the optical axis vector of the image acquisition module and the normal vector of the mirror surface of the heliostat is known; the image acquisition module is calibrated;

(2) Importing the single correction period control command list of the heliostat to be corrected into the data storage module; if correction is performed for the first time, substituting the initial parameters obtained from surveying and measurement into the heliostat mathematical model to generate the initial control command list; if correction has been made, a new control command list is generated according to the previous correction result instead;

(3) When the environmental conditions meet the correction requirements, the communication module reads the single correction period control command list of the data storage module and sends it to the heliostat, so that the heliostat adjusts the rotation angle of each axis according to the preset period;

(4) The heliostat to be corrected sends feedback to the communication module every time the heliostat completes adjustment, and the communication module controls the image acquisition module to shoot celestial body images;

(5) The image acquisition module transmits the celestial body images to the data analysis module, and the data analysis module calculates the deviation $\Delta d_{x'}$ and $\Delta d_{y'}$ between the celestial body image center and the image center in the image coordinate system;

(6) The correction calculation module decomposes the deviation into the corresponding rotation axes according to the rotation mode of the heliostat to obtain the deviation angle of each rotation axis, and then corrects the deviation angle of the two axes according to the deviation angle between the optical axis vector of the image acquisition module and the normal vector of the mirror surface of the heliostat;

(7) After accumulating all the deviation angle data of a single correction period, the correction calculation module performs correction on the heliostat;

(8) The correction calculation module stores the correction results of the heliostat in the data storage module, and iteratively replaces the original single correction period control command list of the heliostat to generate the control command list of the next correction period; and (9) After the correction period ends, the communication module notifies the heliostat to switch to the normal working state.

In the present invention: the correction method for the deviation angle in Step (6) is as follows:

The mirror surface of the heliostat rotates around the orthogonal X axis and Y axis, where the position of the Y axis remains fixed and the X axis rotates with the mirror surface around the Y axis. The deviation angles of this rotation mode, i.e. the deviation angle of the X axis $\Delta\theta_x$ and the deviation angle of the Y axis $\Delta\theta_y$, satisfy the following relations:

$$\begin{cases} \Delta\theta_y = \arctan\left(\dfrac{\Delta d_{y'} \cdot Pix}{f}\right) \\ \Delta\theta_x = \arctan\left(\dfrac{\Delta d_{x'} \cdot Pix}{\sqrt{(\Delta d_{y'} \cdot Pix)^2 + f^2}}\right) \end{cases}$$

Where Pix represents the pixel size of the image acquisition module and f represents the focal length of the image acquisition module.

In the present invention: the correction method for the deviation angle in Step (6) is as follows:

The mirror surface of the heliostat rotates around the orthogonal Z axis and Y axis, where the position of the Z axis remains fixed and the Y axis rotates with the mirror surface around the Z axis. The deviation angles of this rotation mode, i.e. the deviation angle of the Z axis $\Delta\theta_z$ and the deviation angle of the Y axis $\Delta\theta_y$, satisfy the following relations:

$$\begin{cases} \Delta\theta_y = \arctan\left(\dfrac{\Delta d_{y'} \cdot Pix}{f}\right) \\ \Delta\theta_z = \arctan\left(\dfrac{\Delta d_{x'} \cdot Pix}{f \cdot \cos\theta_y}\right) \end{cases}$$

Where, Pix represents the pixel size of the image acquisition module and f represents the focal length of the image acquisition module.

In the present invention: Step (7) adopts the following two correction methods:

Method 1: The error correction model based on various error parameters is derived from the theoretical mathematical model of the heliostat, and the error angle data corresponding to a time sequence is substituted into the error correction model to obtain better error parameter values, so that the revised heliostat mathematical model is closer to the actual mechanical motion.

Method 2: The exact position of a celestial body is determined according to the image acquisition time; the ideal rotation angle sequence of each axis based on time in a single correction period is obtained, and then a connection is established between the ideal rotation angle and the error angle sequence through the acquired time sequence to generate an error angle compensation table for each rotation axis, so that the angle between the normal vector of the heliostat and the incident vector of the celestial body is as small as possible.

Beneficial Effects of the Present Invention

1. The present invention takes celestial bodies (such as the sun, the moon, first-class stars, etc.) that move regularly and have a certain brightness as markers, and can carry out correction during the day and at night, thus reducing the influence on the power generation efficiency and improving the correction efficiency.

2. The present invention takes celestial bodies that move regularly and have a certain brightness as markers, aligns the surface normal of the heliostat with the center of the celestial body, and then calculates the included angle between the surface normal vector and the incident vector through the image acquisition module, and calculates the deviation of the mechanical motion of the heliostat, so that all the heliostats to be corrected can be corrected simultaneously and concurrently by an independent heliostat correction system, thus greatly improving the correction efficiency.

3. A single heliostat correction system is only responsible for the correction of one heliostat and the correction systems on different heliostats are independent of each other. Therefore, failure of a certain heliostat correction system will only affect the heliostat to which it belongs and will not affect the heliostat correction progress of the solar thermal power station.

4. The heliostat correction system comprises an image acquisition module, a data analysis module, a correction calculation module, a data storage module and a communication module. A single heliostat correction system can independently complete all the correction work of a single heliostat, and can ensure the efficiency of heliostat correction.

5. The communication module can send the updated single correction period control command list to the heliostat without sending the data back to the upper computer for processing and then sending by the upper computer, thus reducing the possibility of error.

6. The heliostat correction system can be directly installed on the reflecting surface of the heliostat, and the modularized heliostat correction system can be replaced directly in case of failure, so the equipment maintenance is of low difficulty and cost.

Figure 1:
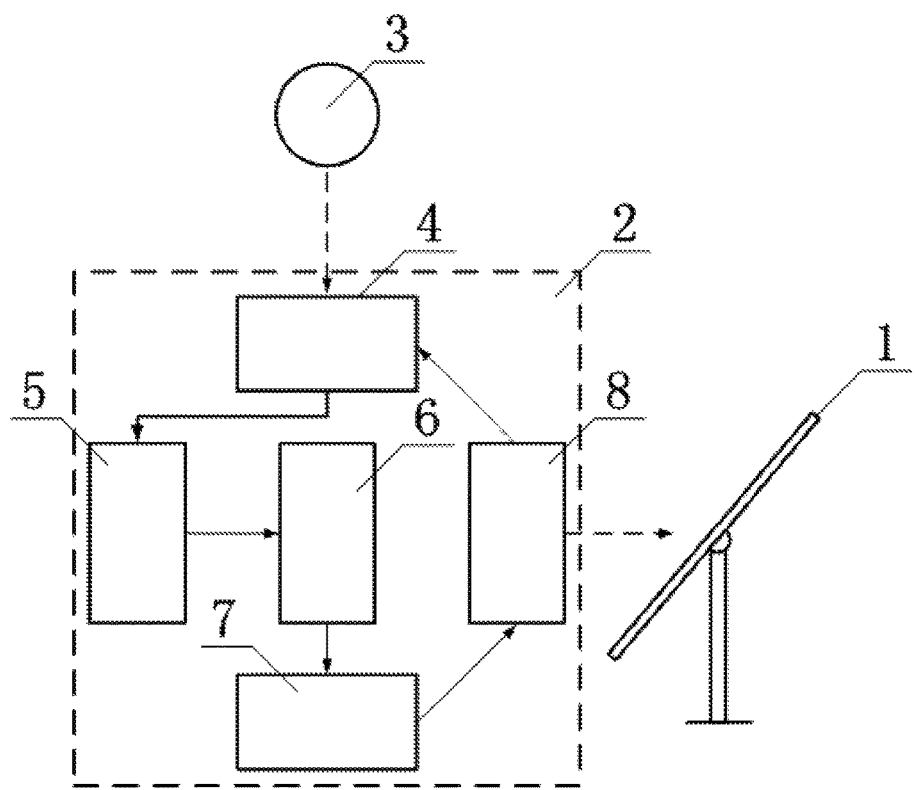
FIG. 1 is a schematic view of the system of the present invention.

In the figures: 1. heliostat; 2. heliostat correction system; 3. celestial body; 4. image acquisition module; 5. data analysis module; 6. correction calculation module; 7. data storage module; and 8. communication module.

DETAILED DESCRIPTION OF PREFERRED EMBODIMENTS

The present invention will now be described in detail with reference to the accompanying drawings and embodiments.

As shown in FIGS. 1 to 7, a heliostat correction system based on celestial body images comprising a heliostat 1 which is fixed on the rotation axis; the reflecting surface of the heliostat 1 is provided with a heliostat correction system 2; in the present invention, the heliostat correction system 2 comprises an image acquisition module 4, a data analysis module 5, a correction calculation module 6, a data storage module 7 and a communication module 8, and is used for the daily correction of the heliostat 1 in the solar thermal power station. The image acquisition module 4 comprises a light intensity adjusting device (a neutral attenuation sheet or other device capable of adjusting the incident light intensity of a celestial body), an imaging light path (a lens or a pinhole) and a digital image sensor; the image acquisition module 4 is in the same direction as the reflecting surface of the heliostat 1; the deviation angle between the optical axis vector of the image acquisition module 4 and the normal vector of the mirror surface of the heliostat 1 is known; the image acquisition module 4 is used for acquiring images of celestial bodies (such as the sun, the moon, first-class stars, etc.) moving regularly in the field of view and having a certain brightness, and then sending the images to the data analysis module 5. The data analysis module 5 analyzes the deviation value between the celestial body image and the image center in the image coordinate system and transmits the deviation value to the correction calculation module 6. The correction calculation module 6 decomposes the deviation value to the corresponding rotation axis according to the rotation mode of the heliostat 1 to obtain the deviation angle of each rotation axis. There are at least two correction methods:

(1) The error correction model based on various error parameters $\Re(x_1, x_2, x_3, x_4, x_5, x_6, x_7, x_8, x_9, x_{10}, x_{11}, x_{12})$ is derived from the mathematical model of the heliostat 1, where $x_1$ and $x_2$ represent the tilt error of the two rotation axes; $x_3$ represents the included angle between the two rotation axes; $x_4$ and $x_5$ represent the zero error of the two rotation axes; $x_6$ and $x_7$ represent the proportionality coefficient of the two rotation axes; $x_8$ and $x_9$ represent the normal error of the mirror surface of the heliostat; $x_{10}$, $x_{11}$ and $x_{12}$ represent the relative position error between the center of the heliostat correction system and the center of the heliostat. The error angle data corresponding to a time sequence is substituted into the error correction model to obtain better error parameter values, so that the revised heliostat mathematical model is closer to the actual mechanical motion.

(2) The exact position of a celestial body is determined according to the image acquisition time; the ideal rotation angle sequence of each axis based on time in a single correction period is obtained, and then a connection is established between the ideal rotation angle and the error angle sequence through the acquired time sequence to generate an error angle compensation table for each rotation axis, so that the angle between the normal vector of the heliostat and the incident vector of the celestial body is as small as possible.

The data storage module 7 is used for storing the correction result of a single heliostat 1 and the single correction period control command list of the heliostat 1, where an initial value is set for the single correction period control command list of the heliostat 1 which is replaced and corrected in an iterative manner according to the correction result. The communication module 8 reads the single correction period control command list from the data storage module 7 and then sends the list to the heliostat 1 while controlling the image acquisition module 4 to shoot according to the rotation period of the heliostat 1.

Figure 2:
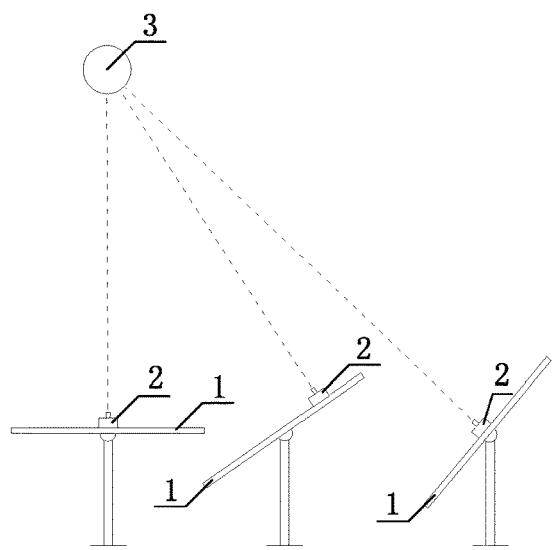
FIG. 2 is a schematic view of the detection of the present invention.

As shown in FIG. 2, each heliostat 1 in the solar thermal power station has an independent heliostat correction system 2, and each heliostat correction system 2 performs a correction process for the celestial body 3. Relative to the distance from the celestial body to the earth, the influence of the position change of the heliostat correction system 2 on the mirror surface on the correction accuracy is negligible, so the heliostat correction system 2 can be installed at any position of the reflecting surface of the heliostat 1, but it needs to be ensured that: 1) the deviation angle between the optical axis vector of the image acquisition module 4 in the heliostat correction system 2 and the normal vector of the mirror surface of the heliostat 1 is known; 2) the image acquisition module 4 in the heliostat correction system 2 is in the same direction as the reflecting surface of the heliostat 1, i.e. both facing celestial bodies or other markers; 3) the coordinate system of the image acquisition module 4 corresponds to the coordinate system of the heliostat 1 or the deviation angle is known.

Figure 3:
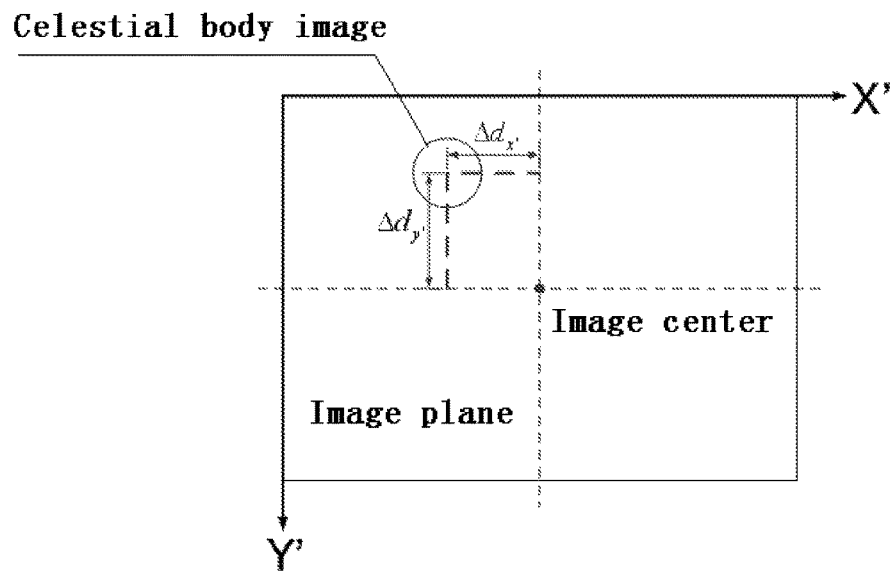
FIG. 3 is a schematic view of deviation calculation of the image coordinate system of the present invention.
Figure 4:
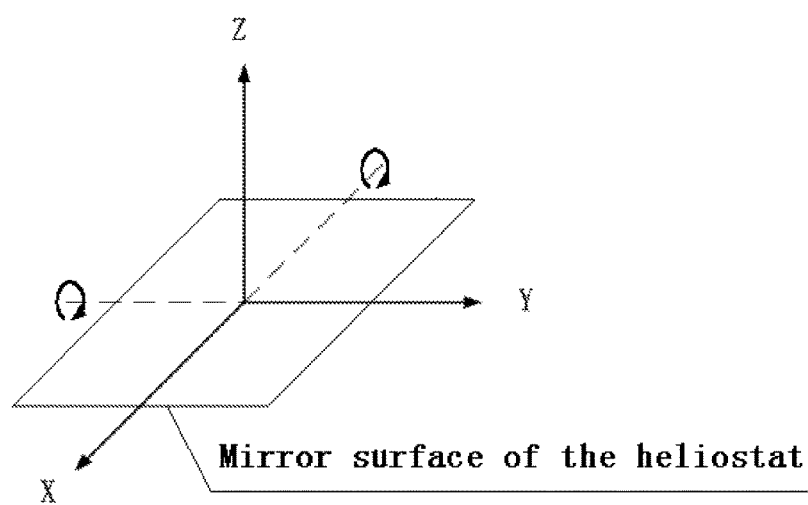
FIG. 4 is a schematic view of the rotation mode of the heliostat of the present invention.
Figure 5:
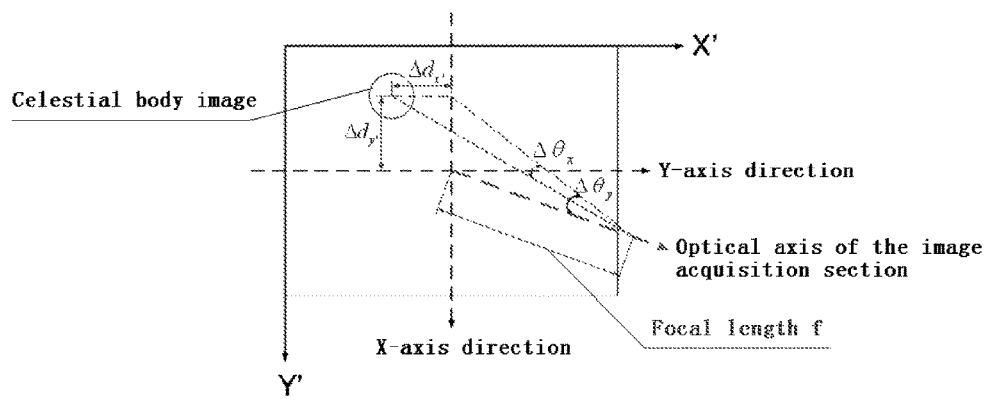
FIG. 5 is an exploded view of the deviation angle of the rotation mode of FIG. 4.

The correction process of a single heliostat 1 in the present invention comprises the following steps:

(1) Installing the heliostat correction system 2 on the heliostat 1 to ensure that the deviation angle between the optical axis vector of the image acquisition module 4 in the heliostat correction system 2 and the normal vector of the mirror surface of the heliostat 1 is known; the image acquisition module 4 is in the same direction as the reflecting surface of the heliostat 1; the coordinate system of the image acquisition module 4 corresponds to the coordinate system of the heliostat 1 or the deviation angle is known; the image acquisition module 4 is calibrated;

(2) Importing the single correction period control command list of the heliostat 1 to be corrected into the data storage module 7; if correction is performed for the first time, substituting the initial parameters obtained from surveying and measurement into the heliostat mathematical model to generate the initial control command list; if correction has been made, a new control command list is generated according to the previous correction result instead;

(3) When the environmental conditions meet the correction requirements, the communication module 8 reads the single correction period control command list of the data storage module 7 and sends it to the heliostat 1, so that the heliostat 1 adjusts the rotation angle of each axis according to the preset period;

(4) The heliostat 1 to be corrected sends feedback to the communication module 8 every time the heliostat completes adjustment, and the communication module 8 controls the image acquisition module 4 to shoot celestial body images;

(5) As shown in FIG. 3, the image acquisition module 4 transmits the celestial body images to the data analysis module 5, and the data analysis module 5 calculates the deviation $\Delta d_{x'}$ and $\Delta d_{y'}$ between the celestial body image center and the image center in the image coordinate system;

(6) The correction calculation module 6 decomposes the deviation into the corresponding rotation axes according to the rotation mode of the heliostat 1 to obtain the deviation angle of each rotation axis, and then corrects the deviation angle of the two axes according to the deviation angle between the optical axis vector of the image acquisition module and the normal vector of the mirror surface of the heliostat;

FIG. 4 is a schematic view of the rotation mode of the heliostat 1. The mirror surface of the heliostat 1 rotates around the orthogonal X axis and Y axis, where the position of the Y axis remains fixed and the X axis rotates with the mirror surface around the Y axis. The decomposition of the deviation angles of this rotation mode is shown in FIG. 5; the deviation angle of the X axis $\Delta\theta_x$ and the deviation angle of the Y axis $\Delta\theta_y$ satisfy the following relations:

$$\begin{cases} \Delta\theta_y = \arctan\left(\dfrac{\Delta d_{y'} \cdot Pix}{f}\right) \\ \Delta\theta_x = \arctan\left(\dfrac{\Delta d_{x'} \cdot Pix}{\sqrt{(\Delta d_{y'} \cdot Pix)^2 + f^2}}\right) \end{cases}$$

Where, Pix represents the pixel size of the image acquisition module and f represents the focal length of the image acquisition module.

Figure 6:
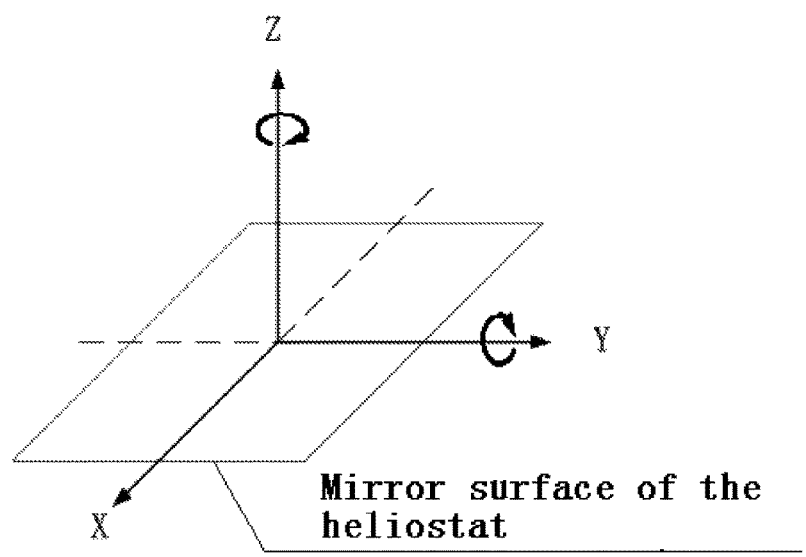
FIG. 6 is a schematic view of another rotation mode of the heliostat of the present invention.
Figure 7:
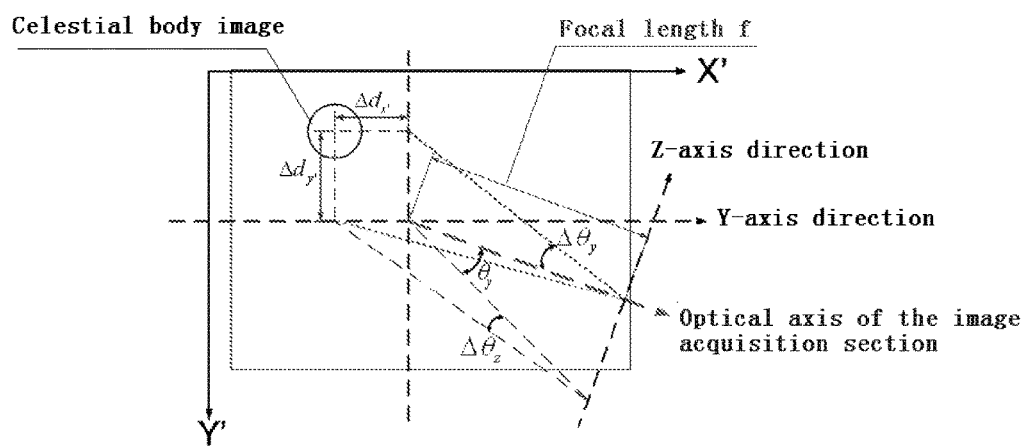
FIG. 7 is an exploded view of the deviation angle of the rotation mode of FIG. 6.

FIG. 6 is a schematic view of another rotation mode of the heliostat 1. The mirror surface of the heliostat 1 rotates around the orthogonal Z axis and Y axis, where the position of the Z axis remains fixed and the Y axis rotates with the mirror surface around the Z axis. The decomposition of the deviation angles of this rotation mode is shown in FIG. 7; the deviation angle of the Z axis $\Delta\theta_z$ and the deviation angle of the Y axis $\Delta\theta_y$ satisfy the following relations:

$$\begin{cases} \Delta\theta_y = \arctan\left(\dfrac{\Delta d_{y'} \cdot Pix}{f}\right) \\ \Delta\theta_z = \arctan\left(\dfrac{\Delta d_{x'} \cdot Pix}{f \cdot \cos\theta_y}\right) \end{cases}$$

Where, Pix represents the pixel size of the image acquisition module and f represents the focal length of the image acquisition module.

(7) After accumulating all the deviation angle data of a single correction period, the correction calculation module 6 performs correction on the heliostat 1;

There are two correction methods:

Method 1: The error correction model based on various error parameters $\mathfrak{R}$ ($x_1, x_2, x_3, x_4, x_5, x_6, x_7, x_8, x_9, x_{10}, x_{11}, x_{12}$) is derived from the mathematical model of the heliostat 1, where $x_1$ and $x_2$ represent the tilt error of the two rotation axes; $x_3$ represents the included angle between the two rotation axes; $x_4$ and $x_5$ represent the zero error of the two rotation axes; $x_6$ and $x_7$ represent the proportionality coefficient of the two rotation axes; $x_8$ and $x_9$ represent the normal error of the mirror surface of the heliostat; $x_{10}$, $x_{11}$ $x_{12}$ and represent the relative position error between the center of the heliostat correction system and the center of the heliostat. The error angle data corresponding to a time sequence is substituted into the error correction model to obtain better error parameter values, so that the revised heliostat mathematical model is closer to the actual mechanical motion.

Method 2: The exact position of a celestial body is determined according to the image acquisition time; the ideal rotation angle sequence of each axis based on time in a single correction period is obtained, and then a connection is established between the ideal rotation angle and the error angle sequence through the acquired time sequence to generate an error angle compensation table for each rotation axis, so that the angle between the normal vector of the heliostat and the incident vector of the celestial body is as small as possible.

(8) The correction calculation module 6 stores the correction results of the heliostat 1 in the data storage module 7, and iteratively replaces the original single correction period control command list of the heliostat 1 to generate the control command list of the next correction period; and (9) After a single correction period ends, the communication module 8 notifies the heliostat 1 to switch to the normal working state.

According to the above embodiments:

I. The heliostat correction system of the present invention takes celestial bodies (such as the sun, the moon, first-class stars, etc.) that move regularly and have a certain brightness as markers, aligns the mirror surface of the heliostat with the center of the celestial body, and then calculates the included angle between the normal vector of the mirror surface and the incident vector through the image acquisition module, to obtain the deviation of the mechanical motion of the heliostat. Therefore, all the heliostats to be corrected can be corrected simultaneously and concurrently by an independent heliostat correction system, thus greatly improving the correction efficiency;

II. The heliostat correction system of the present invention takes celestial bodies (such as the sun, the moon, first-class stars, etc.) that move regularly and have a certain brightness as markers, and can carry out correction during the day and at night, thus reducing the influence on the power generation efficiency and improving the correction efficiency.

III. In the present invention, a single heliostat correction system is only responsible for the correction of one heliostat and the correction systems on different heliostats are independent of each other. Therefore, failure of a certain heliostat correction system will only affect the heliostat to which it belongs and the modularized heliostat correction system can be replaced directly in case of failure, causing no influence on the heliostat correction progress of the whole solar thermal power station.

IV. The heliostat correction system of the present invention comprises an image acquisition module, a data analysis module, a correction calculation module, a data storage module and a communication module. A single heliostat correction system can independently complete all the correction work of a single heliostat and the modularized heliostat correction system can be replaced directly in case of failure, causing no influence on the heliostat correction progress of the whole solar thermal power station.

V. The heliostat correction system of the present invention comprises a communication module which can send the updated single correction period control command list to the heliostat without sending the data back to the upper computer for processing and then sending by the upper computer, thus reducing the possibility of error.

VI. The heliostat correction system of the present invention can be directly installed on the reflecting surface of the heliostat, and the modularized heliostat correction system can be replaced directly in case of failure, so the equipment maintenance is of low difficulty and cost.

The above is a description of embodiments of the present invention, but the present invention is not limited to the above description. It is within the scope of the present invention for persons skilled in the art to make any equivalent modifications and substitutions to this technical proposal. Therefore, all equivalent changes and modifications made without departing from the spirit and scope of the present invention shall fall within the scope of the present invention.

What is claimed is:

1. A heliostat correction system based on celestial body images, provided on a reflecting surface of a heliostat which is fixed on a rotation axis, comprising:
   an image acquisition processor,
   a data analysis processor,
   a correction calculation processor,
   a data storage memory, and
   a communication processor;
   wherein the image acquisition processor is in a same direction as the reflecting surface of the heliostat, the image acquisition processor and the heliostat both facing celestial bodies or other markers;
   a deviation angle between an optical axis vector of the image acquisition processor and a normal vector of the heliostat is known;
   the image acquisition processor is used for acquiring images of the celestial bodies moving regularly in a field of view and having a certain brightness, and then sending the images to the data analysis processor, which analyzes a deviation value between the celestial body image and an image center in an image coordinate system and transmits the deviation value to the correction calculation processor, which decomposes the deviation value to a corresponding rotation axis according to a rotation mode of the heliostat to obtain the deviation angle of each rotation axis;
   the data storage memory is used for storing a correction result of the heliostat and a single correction period control command list of the heliostat;
   the communication processor is used for reading the single correction period control command list from the data storage memory, and then sending the list to the heliostat while controlling the image acquisition processor to shoot according to a rotation period of the heliostat.

2. The heliostat correction system of claim 1, wherein the image acquisition processor comprises a light intensity adjusting device, an imaging light path and a digital image sensor.

3. The heliostat correction system of claim 2, wherein the light intensity adjusting device is a neutral attenuation sheet or other device capable of adjusting an incident light intensity of a celestial body, and the imaging light path is a lens or a pinhole.

4. The heliostat correction system of claim 1, wherein the correction calculation processor adopts two correction methods according to all deviation angle data of a single correction period:
   method 1: an error correction model based on various error parameters is derived from a theoretical mathematical model of the heliostat, and error angle data corresponding to a time sequence is substituted into the error correction model to obtain better error parameter values;
   method 2: an exact position of a celestial body is determined according to an image acquisition time; an ideal rotation angle sequence of each axis based on time in a single correction period is obtained, and then a connection is established between the ideal rotation angle and an error angle sequence through the acquired time sequence to generate an error angle compensation table for each rotation axis.

5. A heliostat correction method based on celestial body images, comprising:
   (1) installing the heliostat correction system of claim 1 on the heliostat to ensure that the image acquisition processor in the heliostat correction system is in a same direction as the reflecting surface of the heliostat, and calibrating the image acquisition processor;
   (2) importing the single correction period control command list of the heliostat to be corrected into the data storage memory; when correction is performed for a first time, substituting initial parameters obtained from surveying and measurement into a heliostat mathematical model to generate an initial control command list; when the correction has been made, a new control command list is generated according to a previous correction result;

(3) when environmental conditions meet correction requirements, reading, by the communication processor, the single correction period control command list of the data storage memory and sending the single correction period control command list to the heliostat, so that the heliostat adjusts a rotation angle of each axis according to a preset period;

(4) sending, by the heliostat, feedback to the communication processor every time the heliostat completes adjustment, and controlling, by the communication processor, the image acquisition processor to shoot the celestial body images;

(5) transmitting, by the image acquisition processor, the celestial body images to the data analysis processor, and calculating, by the data analysis processor, the deviation $\Delta d_{x'}$ and $\Delta d_{y'}$ between the celestial body image center and the image center in the image coordinate system;

(6) decomposing, by the correction calculation processor, the deviation into corresponding rotation axes according to the rotation mode of the heliostat to obtain the deviation angle of each rotation axis, and then correcting the deviation angle of two axes according to the deviation angle between the optical axis vector of the image acquisition processor and a normal vector of a mirror surface of the heliostat;

(7) after accumulating all the deviation angle data of a single correction period, performing, by the correction calculation processor, correction on the heliostat;

(8) storing, by the correction calculation processor, the correction results of the heliostat in the data storage memory, and iteratively replacing the original single correction period control command list of the heliostat to generate the control command list of a next correction period; and (9) after the correction period ends, notifying, by the communication processor, the heliostat to switch to a normal working state.

6. The heliostat correction method of claim 5, wherein the correction method for the deviation angle in step (6) is as follows:

the mirror surface of the heliostat rotates around orthogonal X axis and Y axis, where a position of the Y axis remains fixed and the X axis rotates with the mirror surface around the Y axis; a deviation angle of the X axis $\Delta\theta_x$ and a deviation angle of the Y axis $\Delta\theta_y$, satisfy following relations:

$$\begin{cases} \Delta\theta_y = \arctan\left(\dfrac{\Delta d_{y'} \cdot Pix}{f}\right) \\ \Delta\theta_x = \arctan\left(\dfrac{\Delta d_{x'} \cdot Pix}{\sqrt{(\Delta d_{y'} \cdot Pix)^2 + f^2}}\right) \end{cases}$$

Where, Pix represents a pixel size of the image acquisition processor and f represents a focal length of the image acquisition processor.

7. The heliostat correction method of claim 5, wherein the correction method for the deviation angle in step (6) is as follows:

the mirror surface of the heliostat rotates around orthogonal Z axis and Y axis, where a position of the Z axis remains fixed and the Y axis rotates with the mirror surface around the Z axis; a deviation angle of the Z axis $\Delta\theta_z$ and a deviation angle of the Y axis $\Delta\theta_y$, satisfy following relations:

$$\begin{cases} \Delta\theta_y = \arctan\left(\dfrac{\Delta d_{y'} \cdot Pix}{f}\right) \\ \Delta\theta_z = \arctan\left(\dfrac{\Delta d_{x'} \cdot Pix}{f \cdot \cos\theta_y}\right) \end{cases}$$

Where, Pix represents a pixel size of the image acquisition processor and f represents a focal length of the image acquisition processor.

8. The heliostat correction method of claim 5, wherein step (7) adopts following two correction methods:

method 1: an error correction model based on various error parameters is derived from a theoretical mathematical model of the heliostat, and error angle data corresponding to a time sequence is substituted into the error correction model to obtain better error parameter values, so that a revised heliostat mathematical model is closer to an actual mechanical motion;

method 2: an exact position of a celestial body is determined according to an image acquisition time; an ideal rotation angle sequence of each axis based on time in a single correction period is obtained, and then a connection is established between the ideal rotation angle and an error angle sequence through the acquired time sequence to generate an error angle compensation table for each rotation axis, so that an angle between the normal vector of the heliostat and an incident vector of the celestial body is as small as possible.

* * * * *